United States Patent [19]

Farnsworth et al.

[11] 4,190,898
[45] Feb. 26, 1980

[54] DIGITAL PROCESSOR INPUT/OUTPUT APPARATUS FOR ANALOG, DIGITAL AND DISCRETE DATA

[75] Inventors: David L. Farnsworth, Ft. Collins, Colo.; Ronald E. Thomas, Phoenix, Ariz.

[73] Assignee: Sperry Corporation, New York, N.Y.

[21] Appl. No.: 890,545

[22] Filed: Mar. 20, 1978

[51] Int. Cl.² ............................ G06F 3/05; G06F 5/04; H03K 3/02
[52] U.S. Cl. ............................ 364/900; 340/347 AD; 340/347 DA; 340/347 M
[58] Field of Search ................ 340/347 AD, 347 DA; 364/600, 200 MS File, 900 MS File; 179/1 SA

[56] References Cited

U.S. PATENT DOCUMENTS

| | | | |
|---|---|---|---|
| 3,380,042 | 4/1968 | Townsend | 364/900 |
| 3,546,684 | 12/1970 | Maxwell | 364/900 |
| 3,700,871 | 10/1972 | Montgomery, Jr. | 340/347 AD |
| 3,846,762 | 11/1974 | Gregory | 364/900 |
| 3,921,147 | 11/1975 | Fuhr | 364/200 |
| 3,936,807 | 2/1976 | Edwards | 364/900 |
| 4,047,159 | 9/1977 | Boudry | 364/200 |

*Primary Examiner*—James D. Thomas
*Attorney, Agent, or Firm*—Howard P. Terry; Albert B. Cooper

[57] ABSTRACT

Input/output (I/O) apparatus for a system is disclosed utilizing a digital processor for entering analog, digital and discrete data into the processor and receiving analog, digital and discrete data from the processor via an I/O data bus. A plurality of analog data signals are applied sequentially to an analog to digital converter via an analog input multiplexer. The resultant digital data are applied in bit parallel fashion to predetermined bits of the I/O data bus reserved for the input and output of analog data. Digital and discrete data is entered with the analog data by shifting the data from each of the digital and discrete data sources in bit parallel fashion into associated shift registers. The contents of the registers are shifted serially into respective predetermined bits of the data bus reserved for the input and output of the digital or discrete data. The contents of the plurality of shift registers for the digital or discrete data are shifted into the respective bits of the data bus in serial fashion while the sequence of parallel digital data from the analog inputs are entered in paralell into the data bus. Analog data is received from the bus via a digital-to-analog converter connected to the data bus bits reserved for the analog data. The digital words corresponding to the analog output data are sequentially applied in parallel to the digital-to-analog converter whose output is sequentially strobed into a plurality of sample and hold circuits to provide the analog data. Simultaneously with providing the sequence of analog data words, the I/O bus bits reserved for digital or discrete data provide the data in bit serial fashion to output shift registers. The outputs from the shift registers are strobed in parallel into the corresponding output digital or discrete data utilization devices.

10 Claims, 6 Drawing Figures

DIGITAL PROCESSOR INPUT/OUTPUT APPARATUS FOR ANALOG, DIGITAL AND DISCRETE DATA

BACKGROUND OF THE INVENTION

1. Field of the Invention

The invention relates to systems utilizing digital processors particularly with respect to data input/output apparatus therefor.

2. Description of the Prior Art

Systems are prevalent that include a digital processor for operating upon large amounts of analog, digital and discrete input data to provide large amounts of analog, digital and discrete output data for use in utilization devices. Such systems are finding wide spread usage in modern aircraft for integrating the various aircraft flight data sensors and electronic equipment such as radios and the like to provide the necessary control, display and annunciation functions to the flight controls, flight instruments, display panels and the like. The analog inputs to such systems normally include gyro synchro pickoffs, control wheel force or displacement sensors as well as autopilot control inputs such as pitch and bank wheels and the like. Such systems also include autopilot mode controllers with numerous push buttons utilized for mode selection, which push buttons may be individually and selectively illuminated by lamps included therein. A computer control panel with an alphanumeric data entry keyboard with illuminated key annunciations may also be included for entering data into the system. Such systems also include numerous displays such as segmented alphanumeric readout devices operated by digital signals normally in binary coded decimal format and additionally include a large variety of discrete inputs such as valid/invalid signals from various sensors and equipments, discrete switch positions and the like. Digital signals are also entered from digital data sources such as the system air data computer, etc.

Such prior art systems also provide large amounts of analog, digital and discrete output data such as the analog outputs to the various control surface servos, analog signals to the various flight instruments as well as digital data to the displays and discrete outputs such as instrument failure warning flags and the like.

In these prior art systems the analog signals are generally multiplexed into a single analog-to-digital converter whose sequential outputs are entered into the system digital processor in bit parallel fashion via a parallel bit data bus. The outputs of the alphanumeric data entry keyboards, the mode selection push button panels and the like are encoded into binary digital format and these binary data entered into the data bus in bit parallel fashion either prior to or subsequent to the entry of the analog data. Generally the discrete inputs are multiplexed or combined in latches for parallel entry into the data bus.

In a similar manner in the prior art systems the analog outputs are provided from the data bus as a sequence of bit parallel words that are sequentially strobed into a digital-to-analog converter whose output is multiplexed to the various analog utilization devices. The digital outputs such as the illumination of the keyboard lamps and the energization of the digital displays are sequentially provided in bit parallel fashion through decoding circuits associated with the various digital utilization devices. The discrete outputs are provided in parallel fashion and demultiplexed into the various discrete utilization devices.

It is thus appreciated that since the data enters and exits the system primarily in bit parallel form, numerous line drivers and receivers as well as logic circuits are required. Additionally, numerous encoders and decoders are necessitated for the keyboards and displays as well as complex multiplexers for the various digital and discrete data. Thus the prior art systems require large amounts of expensive input/output components, increasing the bulk, weight and power dissipation of the system which requirements are undesirable particularly in aircraft environments. These prior art arrangements necessitated large numbers of interface wires and connections thereby decreasing reliability and complicating installation procedures resulting in increases in installation errors.

It will be appreciated that because of the numerous encoders and decoders required for the input and utilization devices, significant amounts of buffering between different logic levels is required. It will furthermore be appreciated that because of the requirement for sequential input and output with respect to all of the analog, digital and discrete data, substantial computer time is required for the system I/O functions.

Because of the significant number of input and output lines required to perform the I/O function in prior art apparatus large numbers of line buffers are required in interfacing the various logic levels often utilized in such systems.

It will be appreciated that in the prior art systems discussed, the word length of the digital processor is determined by system considerations other than I/O requirements, which word length determines the width of the I/O data bus. Typically computer word lengths are integral multiples of 8 whereby a 16 bit word length may typically be utilized. Commercially procurable analog-to-digital and digital-to-analog converters typically provide approximately 12 bits of resolution and therefore in prior art systems when the 12 bit analog information is being entered or received from the data bus the availability of the additional data bus bits is not efficiently utilized. This also requires the sequential handling of the analog, digital and discrete data thereby requring considerable amounts of computer time to perform the input/output functions.

As discussed above, the prior art systems utilize data entry and mode selection keyboards with numerous selection keys, the outputs of which are encoded with the encoded data being applied to the data bus. This prior art arrangement requires complex circuitry to perform not only the encoding function but also to debounce the keyboard and mode selection switches.

SUMMARY OF THE INVENTION

The above disadvantages of the prior art are substantially eliminated by the present apparatus for simultaneously entering analog, digital and discrete data signals into a digital processor having a parallel bit input data bus. The invention also encompasses apparatus for simultaneously receiving analog, digital and discrete data signals from a parallel bit output data bus of a digital processor. In a practical embodiment the invention contemplates input/output apparatus for entering and receiving the analog, digital and discrete data signals from the digital processor on a parallel bit input/output data bus. The apparatus for entering the data comprises a multiplexer responsive to the analog data for sequentially providing the analog signals to an analog-to-digital converter whose output is applied in parallel to predetermined bits of the data bus. The digital as well as discrete data is entered in parallel into parallel to serial converters which apply the bits of the data in serial fashion to further predetermined bits of the data bus simultaneously with the application of the analog signals.

In a similar manner data are simultaneously received from the parallel bit data bus by a digital-to-analog converter coupled to first predetermined bits of the data bus for sequentially providing analog data corresponding to parallel digital data provided to the first predetermined bits by the processor. A plurality of sample and hold circuits sequentially sample the output of the digital-to-analog converter as the data is sequentially received. The outputs of the sample and hold circuits provide the required analog data. Serial to parallel converters coupled to respective further bits of the data bus receive the digital and discrete data in bit serial fashion simultaneously with the parallel digital data applied to the digital-to-analog converter. Digital and discrete data are then provided in parallel format from the serial to parallel converters.

DESCRIPTION OF THE PREFERRED EMBODIMENT

The preferred embodiment of the invention to be described may be utilized in an integrated cockpit system for aircraft which will integrate the functions of the radios, instruments, flight controls, flight directors, sensors and the like through dedicated control panels. It is appreciated that the digital processor I/O concepts are, however, not limited to such applications.

Figure 1A:
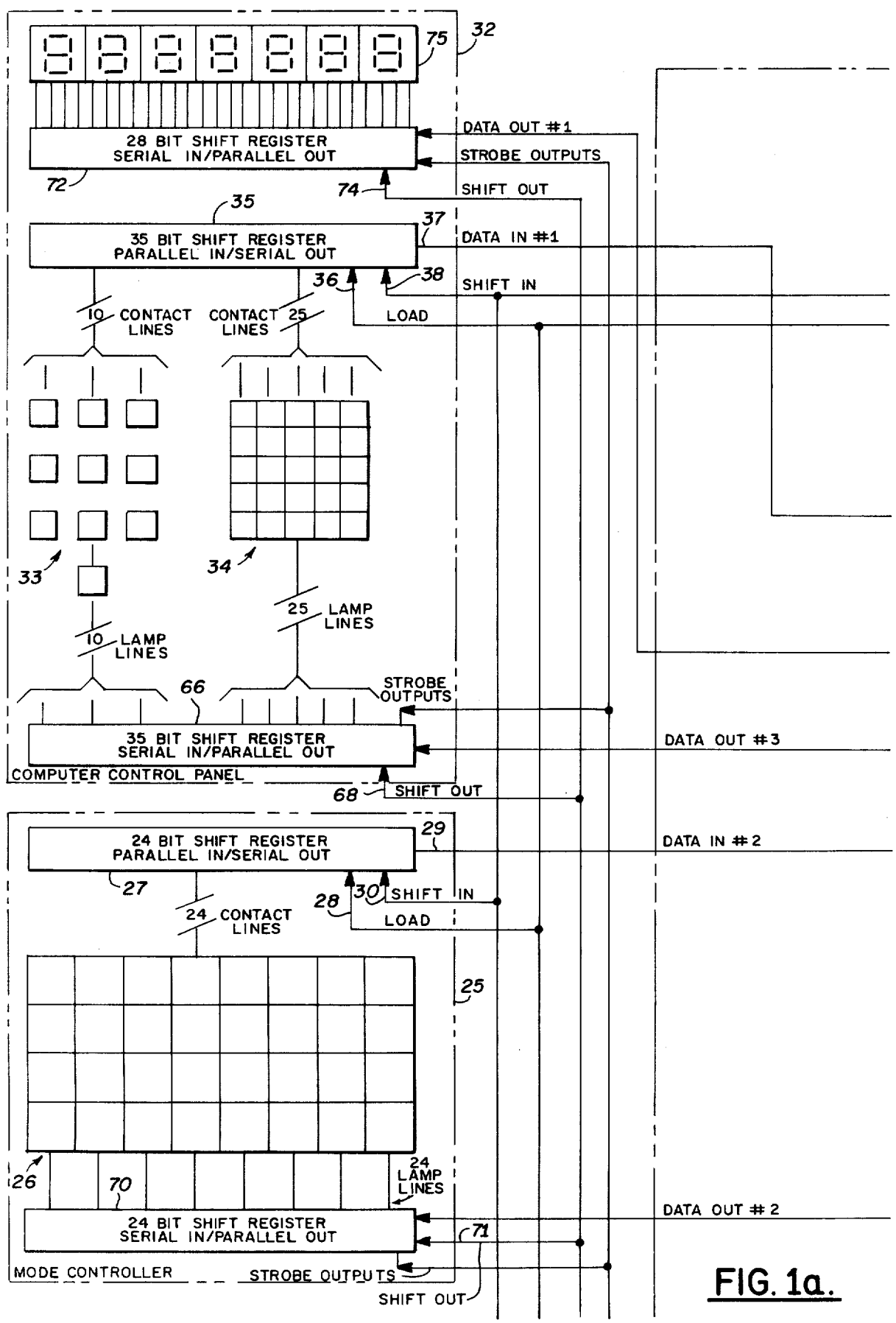
FIG. 1 comprised of FIGS. 1a, 1b, 1c and 1d is a block schematic diagram illustrating the input/output apparatus of the present invention.
Figure 1B:
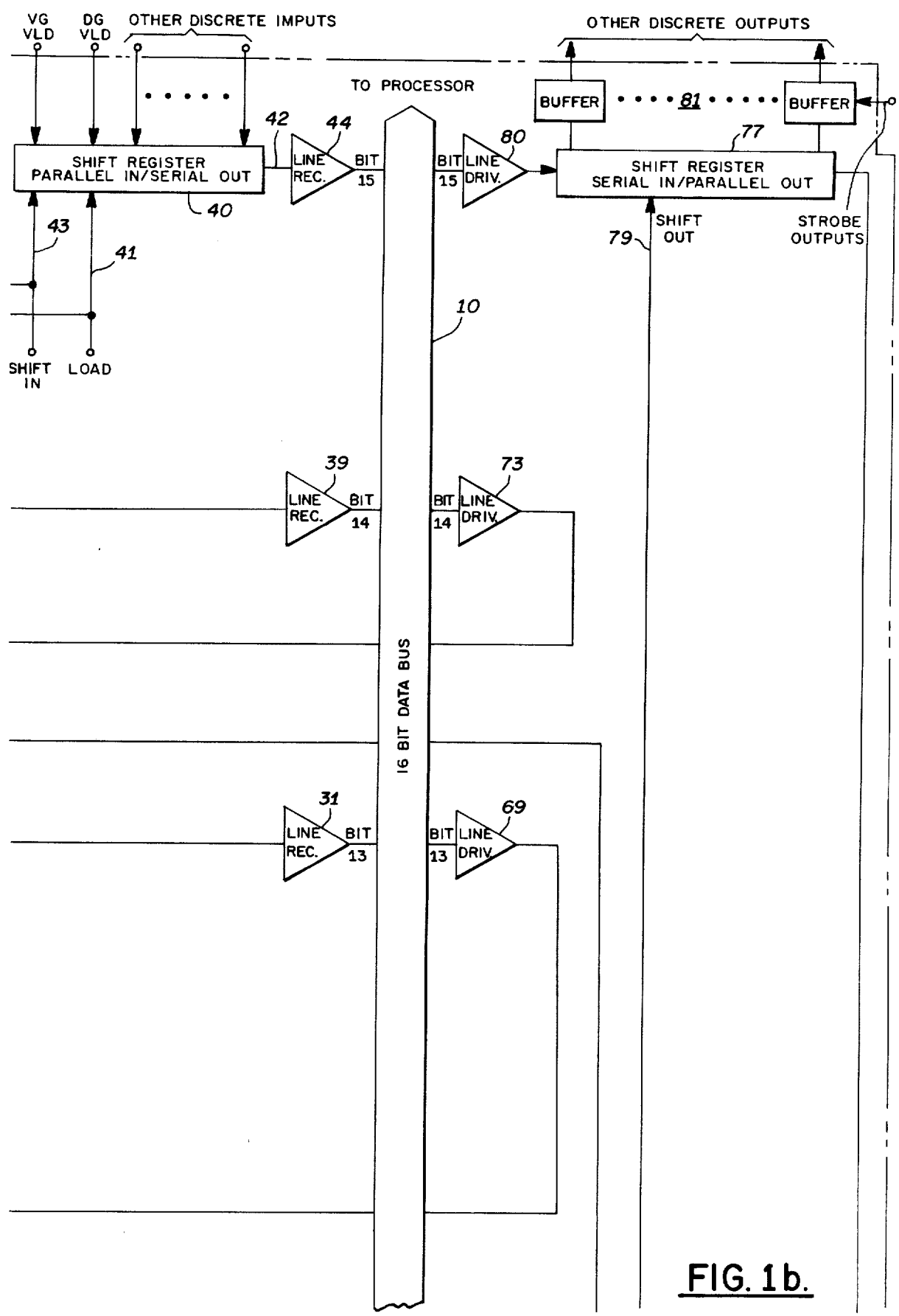
Figure 1C:
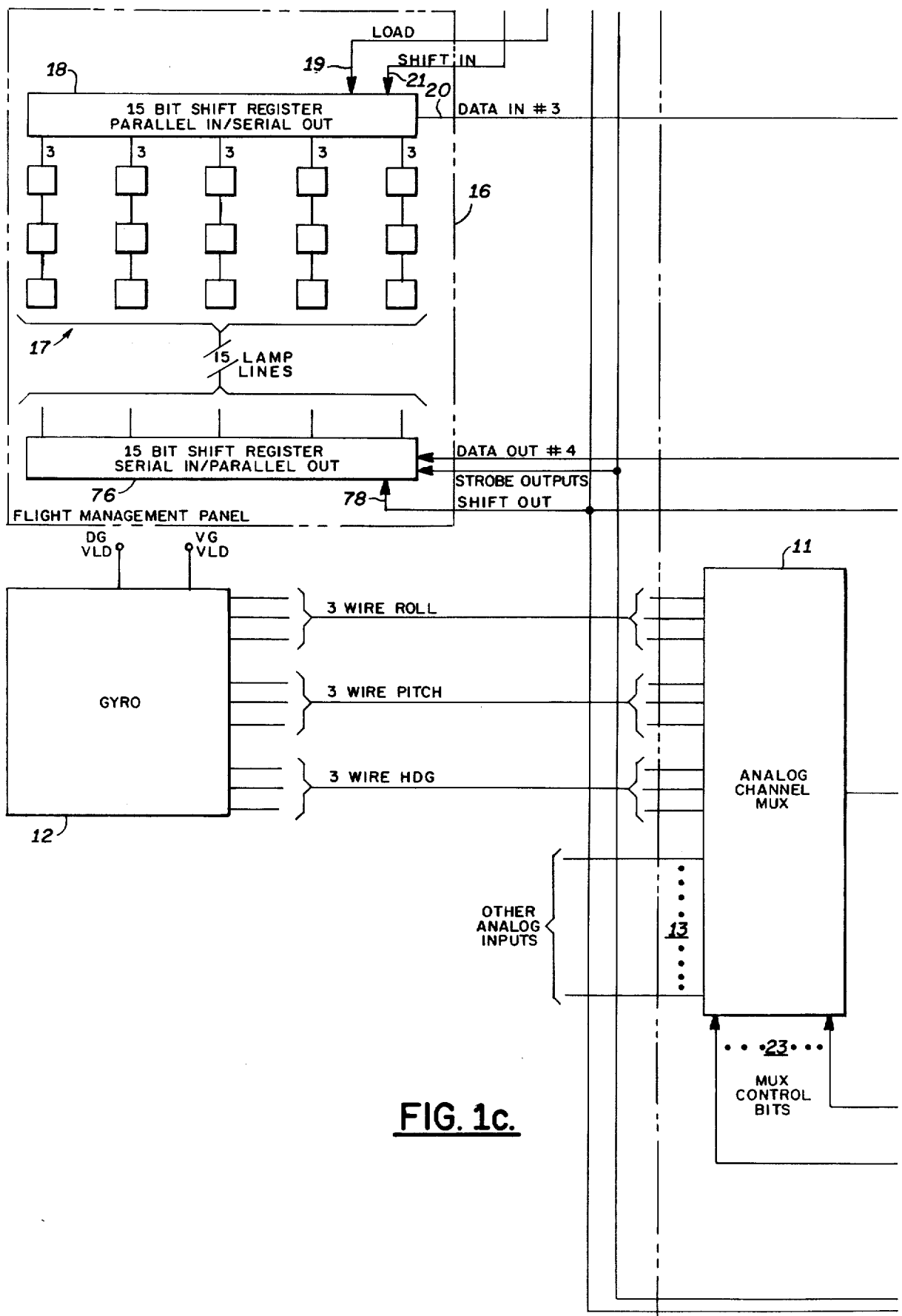
Figure 1D:
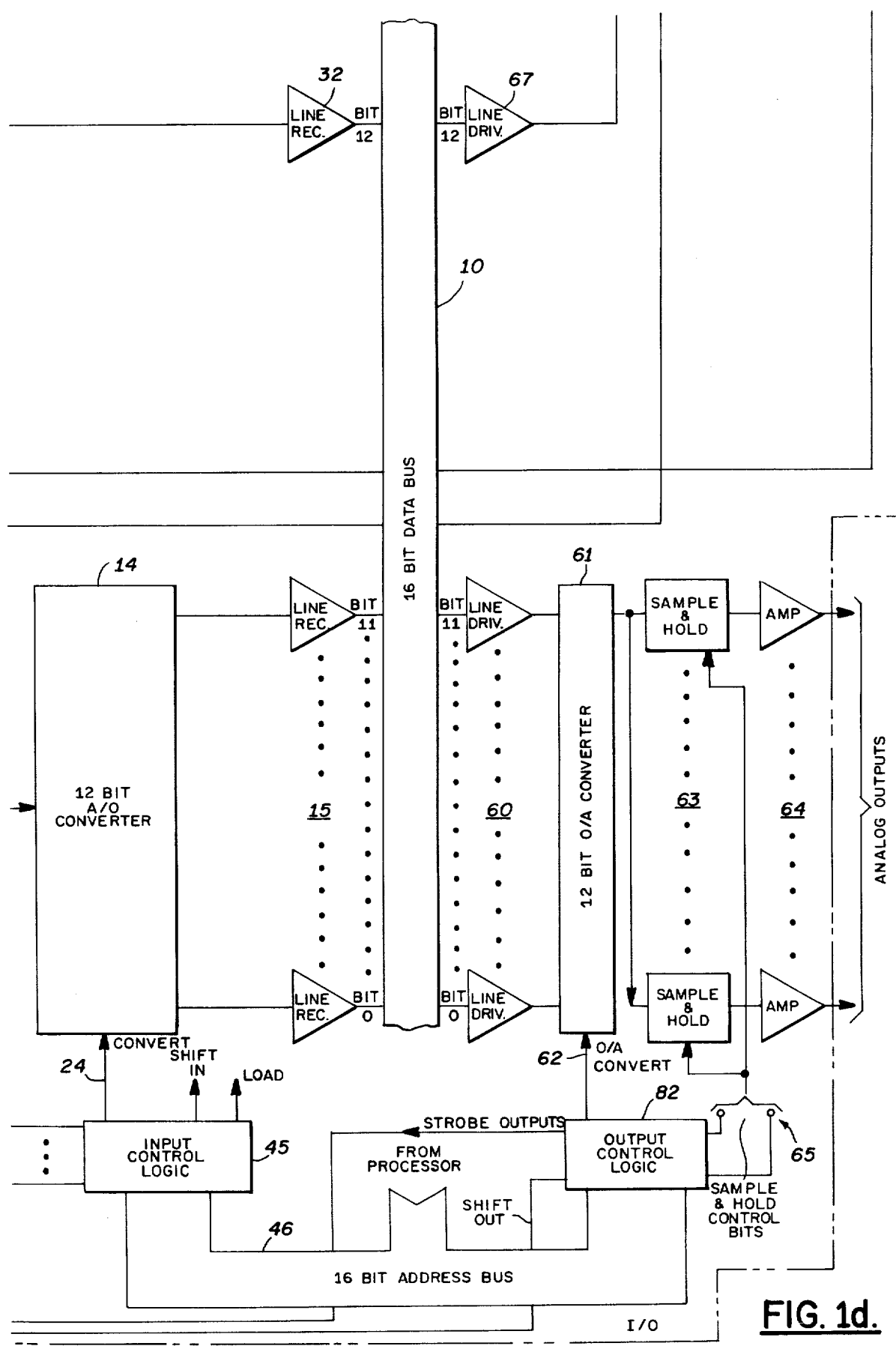

Referring to FIG. 1 which is comprised of FIGS. 1a, 1b, 1c and 1d, a block schematic diagram illustrating the input/ output apparatus of the present invention is illustrated. In order to attain a comprehensive appreciation of the apparatus, it is suggested that FIGS. 1a –1d be assembled into a unitary block diagram with FIG. 1a providing the upper left hand portion thereof; FIG. 1b providing the upper right hand portion thereof; FIG. 1c providing the lower left hand portion thereof and FIG. 1d providing the lower right hand portion thereof.

In the apparatus of FIG. 1, all of the analog, digital and discrete data is entered into and received from a parallel 16 bit data input/output bus 10 which provides the I/O functions for the system digital processor (not shown). Analog data is entered into the system through a multi-input multiplexer 11 coupled to receive the system analog data. For example, the vertical and directional gyros 12 provide nine analog signals from the 3 wire roll, pitch and heading synchro pickoffs thereof. The remaining analog inputs to the system are indicated at 13.

The analog output from the multiplexer 11 is applied to an analog-to-digital converter 14 which converts the analog input transmitted by the multiplexer 11 into a parallel bit digital word which typically may be 12 bits long. The parallel digital output from the converter 14 is applied to bit 0 through bit 11 of the data bus 10 via respective line receivers 15. The line receivers 15 are utilized to buffer the voltage levels provided by the logic of the converter 14 into the voltage levels required by the digital processor.

Multiplexer control bits 23 sequentially select the analog input lines to the multiplexer 11 for connection to the analog-to-digital converter 14 and convert signals on a line 24 initiate the conversion of the analog inputs to the converter into the parallel digital words applied to bit 0 through bit 11 of the data bus 10.

In accordance with the invention, bit 12, bit 13, bit 14 and bit 15 of the 16 bit data bus 10 receive the system digital and discrete data simultaneously with the receipt of the analog data at bits 0 to 11. In the preferred embodiment illustrated, bit 12 receives its data from the pushbutton selectors of the flight management panel 16. The flight management panel 16 includes, for example, fifteen selection pushbuttons 17 for performing the various flight management functions of the system. For example, the pushbuttons 17 may be utilized to select and tune the aircraft radio equipment, to perform thrust, auto throttle and speed control management as well as to request data to be displayed with respect to the various aspects of aircraft flight management.

The fifteen switch outputs from the pushbutton switches 17 are connected to the respective stages of a parallel in/serial out fifteen bit shift register 18 for entry of the binary states of the respective switches therein. The 15 bit word from the pushbutton switches 17 is loaded in parallel into the register 18 in response to a load command at the load command input 19 of the register 18. The 15 bit word in the register 18 is serially shifted out on a line 20 in response to shift pulses on a line 21. Thus the states of the pushbutton switches 17 are simultaneously inserted into the shift register 18 by the load pulse on the line 19 and thereafter serially shifted out in 15 clocktimes by pulses on the line 21. The serial data shifted onto the line 20 is applied to bit 12 of the data bus 16 via a line receiver 22 which provides the voltage level matching function discussed above with respect to the line receivers 15.

Bit 13 of the data bus 10 is utilized to receive data from the mode controller 25 of the system. The mode controller 25 includes, for example, twenty-four pushbutton switches 26 for providing the mode controlling functions of the system. The pushbutton switches 26 may be utilized to select such aircraft control modes as altitude hold, vertical speed hold, attitude hold, localizer capture or track and the like. The states of the pushbutton switches 26 are entered in parallel into a parallel in/ serial out 24 stage shift register 27 in response to a load command on a line 28. The 24 bit data word representative of the respective states of the twenty-four switches 26 are serially shifted onto a line 29 in response to shift pulses on a line 30. The bit serial data on the line 29 is entered into bit 13 of the data bus 10 via line receiver 31.

Bit 14 of the data bus 10 is utilized to receive data from the computer control panel 32 of the system. The computer control panel 32 includes a data entry keyboard 33 comprising, for example, ten keyboard pushbutton switches. The keyboard 33 may have a conventional data entry format for alphanumeric data and may also be utilized for entering data into the scratch pad memory of the processor. The computer control panel 32 also includes, for example, twenty-five pushbutton switches 34 for entering numerical data with respect to specific aircraft parameters such as aircraft weight, decision height, and the like. The outputs from the ten switches 33 and the twenty-five switches 34 are entered in parallel into a parallel in/serial out thirty-five stage shift register 35 in response to a load command on a line 36. The thirty-five bit word in the register 35 is serially shifted onto a line 37 in response to shift pulses on a line 38. The serial data provided on the line 37 by the shift register 35 is entered into bit 14 of the data bus 10 via a line receiver 39.

The data entry apparatus of the present invention also includes a parallel in/serial out shift register 40 for entering system discrete data into the processor. For example, the gyro 12 provides two signals indicating the validity of the data provided by the vertical gyro and the directional gyro as indicated by the legends "VG/VLD" and "DG/VLD". These valid signals are applied as inputs to the shift register 40 as indicated by the legends with the remaining discrete inputs of the system being entered into the register 40 as indicated. It will be appreciated that all of the discrete inputs are entered in parallel into the register 40 in response to a load command on a line 41. The discrete bits of the word entered in parallel into the register 40 are serially applied to a line 42 in response to shift pulses on a line 43. The serial data from the register 40 is entered into bit 15 of the data bus 10 via a line receiver 44.

Figure 2:
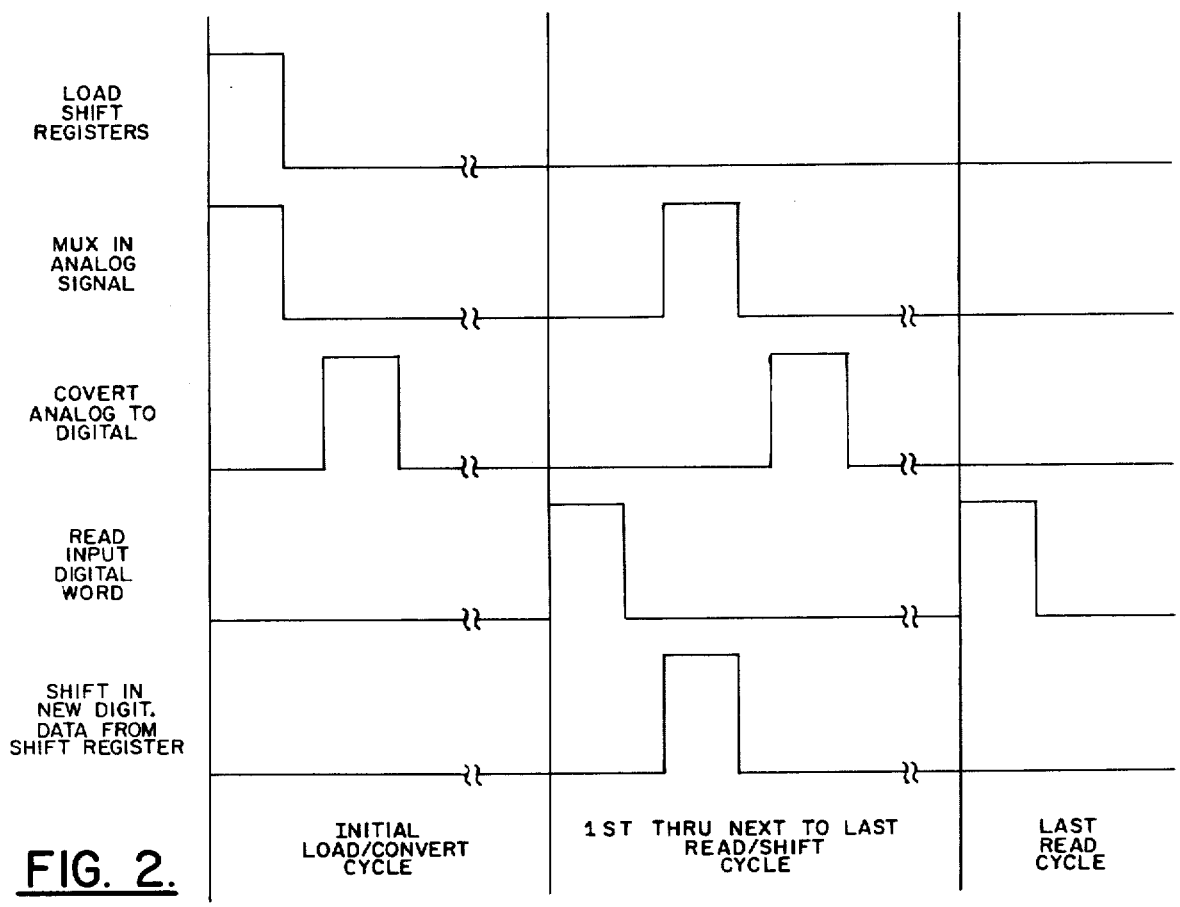
FIG. 2 is a timing diagram of the signals that control the input operations of the apparatus of FIG. 1.

The multiplexer control bits on the lines 23, the convert pulse on the line 24 as well as the load and shift signals into the data input shift registers 18, 27, 35 and 40 are provided by input control logic 45 under control of signals from the digital processor on a sixteen bit control/address bus 46. In a conventional manner, the digital processor provides digital address signals on the bus 46 which signals are decoded into discrete control signals in the control logic 45 to provide the indicated signals. The control logic 45 includes the necessary pulse generators responsive to the decoded address signals from the bus 46 for generating the required control signals. FIG. 2 illustrates the relative timing of the control signals with respect to each other.

In order to enter the analog, digital and discrete data, the digital processor commands the control logic 45 via the control bus 46 to provide a load pulse to the shift registers 18, 27, 35 and 40 which enters the associated data in parallel into the registers. For example, on receipt of the load pulse, the computer control panel 32 enters all of the keyboard data into the thirty-five bit shift register 35. Simultaneously therewith, the digital processor controls the input control logic 45 to provide the multiplexer control bits 23 to the multiplexer 11 so as to apply a selected analog input signal to the converter 14. The convert command is then applied to the lead 24 which converts the selected analog signal into a parallel twelve bit digital signal which in turn is applied to bit zero through bit 11 of the data bus 10 via the line receivers 15. Simultaneously, the output from the first stage of each of the registers 18, 27, 35 and 40 is applied through the respective line receiver 22, 31, 39 and 44 to bit 12 through bit 15 of the data bus 10. Thus, the data bus 10 contains the digital equivalent of the analog signal being converted (bits 0 to 11) and the four bits of discrete data from the shift registers (bits 12 to 15).

At the start of the next cycle the digital processor enters the sixteen bits of data on the bus 10, controls the multiplexer 11 to transfer another analog channel to the converter 14 and applies a shift pulse to the registers 18, 27, 35 and 40 to shift the next four bits of digital and discrete data to the data bus 10. While the analog-to-digital converter 14 is converting the new analog signal to a digital number, the processor unpacks the old data placing it in appropriate locations in memory. Thus the conversion time required by the converter 14 is efficiently utilized by the system in performing the I/O functions. When the digital processor is concluded unpacking the old data, it transfers to the I/O and fetches the new twelve bit digital output from the analog-to-digital converter 14 on bits 0 through 11 along with the four new discrete data bits on bits 12-15 of the data bus 10.

The above sequence is repeated for thirty-four additional cycles which provides entry of thirty-five twelve bit samples of thirty-five analog signals as well as the simultaneous entry of all of the discrete data in all of the shift registers 18, 27, 35 and 40. It will be appreciated that the total number of cycles for a data entry procedure is determined by whichever is greater the number of analog channels or the number of serial bits of discrete data. Since all of the data is repetitively entered approximately every forty milliseconds in a typical system, continuous digital samples of the analog signals are provided to the processor as well as the continuous states of the various digital and discrete sources. Thus, the processor can determine if a particular key on a particular panel has been depressed, so that is can accordingly perform associated functions. Effectively all the outputs from the analog sensors in the system and all the digital and discrete data are simultaneously entered into the processor.

In a manner similar to that described above with respect to the entry of data into the processor via the data bus 10, the digital processor simultaneously provides the system analog, digital and discrete data to the output utilization devices via the bus 10. During the data output procedure, the processor sequentially provides twelve bit parallel data representative of the plurality of analog outputs to bits 0 to 11 of the bus 10. This data is applied through respective line drivers 60 to a twelve bit digital-to-analog converter 61. The line drivers 60 are utilized as voltage translators for matching the voltage levels utilized by the logic of the processor to the voltage levels of the logic utilized in the converter 61. A D/A convert signal on a line 62 initiates the conversion operation thereof.

The analog samples provided by the converter 61 corresponding to the sequence of data applied to the bits 0 through 11 by the processor are sequentially entered into sample and hold circuits 63 which provide the system analog output signals via respective amplifiers 64. The sample and hold circuits 63 are sequentially strobed in synchronism with the application of the data to the data bus 10 by the processor through sample and hold control bits on lines 65.

Simultaneously with the receipt of the analog outputs from bits 0 to 11 of the data bus 10, bits 12 to 15 of the data bus provide respective digital and discrete data to system utilization devices. Bit 12 of the bus 10 provides discrete output data in bit serial fashion to a thirty-five bit serial in/parallel out shift register 66 in the computer control panel 32. The data is applied via a line driver 67 for logic level matching. The data is shifted into the register 66 by shift pulses on a line 68. The thirty-five outputs from the register 66 are connected respectively to energize the pushbutton illumination lamps in each of the thirty-five pushbuttons of the computer control panel 32.

Bit 13 of the data bus 10 provides bit serial data via a line driver 69 to a serial in/parallel out shift register 70 in the mode controller 25. The bit serial data from bit 13 of the data bus is serially strobed into the register 70 by shift pulses on a line 71. The twenty-four outputs from the shift register 70 are connected to the pushbutton illumination lamps associated with the pushbuttons of the mode controller 25.

Bit 14 of the data bus 10 provides bit serial data to a serial in/parallel out shift register 72 in the computer control panel 32 via a line driver 73. The data is serially shifted into the register 72 by shift commands on a line 74. The outputs from the register 72 are connected to the binary coded deciminal inputs of an alphanumeric display 75. The data provided to the bit 14 of the data bus 10 by the processor is in binary coded decimal format and is serially shifted into the register 72 for parallel application to the display 75 for the display of desired alpha-numeric information.

Bit 15 of the data bus 10 is utilized to provide bit serial data to a serial in/parallel out shift register 76 in the flight management panel 16 as well as to a serial in/parallel out shift register 77 for providing the remaining discrete data to the system. The registers 76 and 77 are connected in series with respect to each other and receive the bit serial data from the bit 15 of the data bus 10 in response to shift commands on lines 78 and 79. The data is provided through a line driver 80 for logic level matching purposes. After the data is shifted into the registers 76 and 77, the outputs of the register 76 are provided in parallel to respective lamp lines connected to the pushbutton illumination lamps of the pushbuttons 17. The outputs of the register 77 are provided through buffers 81 to the remaining discrete utilization devices of the system.

Figure 3:
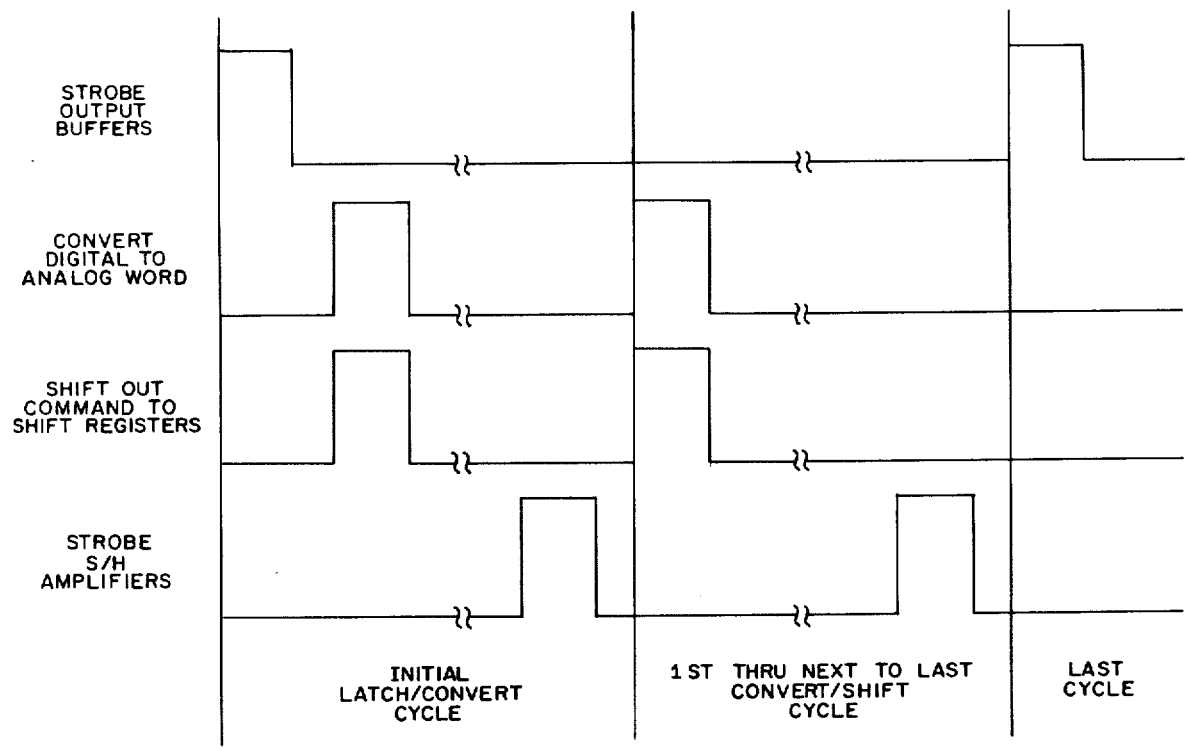
FIG. 3 is a timing diagram of the signals that control the output operations of the apparatus of FIG. 1.

The shift out signal on the lines 68, 71, 74, 78 and 79 as well as the D/A convert signal on the line 62 and the sample and hold control bits on the lines 65 are provided by output control logic 82 in response to the commands from the processor on the address bus 46 in the manner described above with respect to the input control logic 45. The timing of the control signals is illustrated in FIG. 3.

In order to provide analog, digital and discrete output data, the processor assembles a sixteen bit word with bits 0 to 11 comprising a sample of one of the analog outputs and bits 12 to 15 comprising one bit of the digital data for each of the separate utilization devices described. For example, bit 12 contains one bit of data for the computer control panel 32, bit 13 contains one bit of data for the mode controller 25, bit 14 contains one bit of data for the display 75 and bit 15 contains one bit of data either for the flight management panel 16 or the remaining discrete outputs 81. The initial output cycle and final output cycle provide for a strobe command that allows all discrete and digital output data to be latched into their respective buffers. The sixteen bit output word is placed on the data bus 10 and thereafter the processor provides a shift out command to the registers 66, 70, 72, 76 and 77 as well as a convert command to the digital-to-analog converter 61. The four bits of discrete data are thereby shifted into the respective shift registers as the converter 61 performs the required conversion. Thereafter, the appropriate sample and hold circuit 63 is strobed and the analog sample stored therein. This process is continued for the number of additional cycles required to fill all of the data output shift registers and provide all of the conversions for the data on bits 0 to 11. Thus, for each of the sequentially provided analog samples on the bits 0 to 11, four bits of discrete information are simultaneously provided by the bits 12 to 15.

By the described process, all of the shift registers in the peripheral panels 16, 25, 32 and 75 as well as the internal shift registers such as the register 77 in the I/O of the processor and all of the analog outputs 64 are completely updated. Since in a typical system the data updating occurs approximately every forty milliseconds, it is appreciated that the plurality of required analog signals are provided by the amplifiers 64 and all of the discrete and digital functions such as the illumination of the various pushbuttons and display of data in the device 75 are performed substantially continuously.

It will be appreciated from the foregoing that binary digital data, such as from an air data computer, as well as discrete data may be entered into bits 12-15 of the data bus 10 as well as received therefrom. The binary word to be entered is shifted in parallel into a shift register and thereafter serially shifted into the associated data bus bit as described above. The data bus bits such as bits 12-15 may be dedicated to the outputs of respective digital data sources wherein the data is entered into the bus one bit at a time along with the individual analog inputs as discussed above. In a similar manner, such digital data may be outputted from the bits 12-15 of the data bus 10.

It will be appreciated that the outputs of data sources as well as the inputs to utilization devices may be combined by utilizing plural serially connected shift registers into which the plural inputs are shifted in parallel with the contents of the serially connected shift registers being shifted serially into the data bus 10 in concatenated fashion. This arrangement is illustrated by shift registers 76 and 77, with respect to the output of data.

As discussed above, by utilizing the precepts of the present invention, the encoding circuitry normally utilized to encode keyboards in the prior art may be eliminated from the panels 16, 25 and 32. It will be appreciated, however, that even should the encoding circuitry be utilized, the remaining advantages of the invention are realized by applying the encoded data to the bits 12-15 of the data bus 10 in serial fashion simultaneously with the analog data in accordance with the invention. Although the above described embodiment of the invention was explained in terms of parallel in/serial out shift registers for the entry of the data, other parallel-to-serial converters could be utilized to the same effect. Similarly, although the data output function was explained in terms of serial in/parallel out shift registers, it is appreciated that other serial-to-parallel converters may equivalently be utilized.

It is appreciated from the foregoing that the invention provides economical apparatus utilizing a minimum of hardware for inputting and outputting a large amount of digital and analog data. The digital and discrete data is shifted into the processor at the same time that the analog data is entered. Since by this process the processor has access to the individual keys of the keyboards, software procedures may be utilized to debounce the keyboard and mode select switches rather than hardware as was required in the prior art. Since all of the bits of the data bus are utilized for both the input and output procedures, more efficient utilization of the I/O equipment is achieved compared to the prior art where only partial utilization was possible. Additionally, the I/O procedures should be faster than in the prior art since analog, discrete and digital data are entered simultaneously as compared to the sequential entry of the data in the prior art apparatus. Since the use of shift registers eliminates the requirement for any keyboard encoders or multiplexers for the discrete data, lower power as well as less expensive and fewer components may be utilized with the present invention. Since the number of interface wires is significantly reduced, reliability is increased and installation is simplified thereby decreasing installation errors.

The invention provides exceedingly economical I/O apparatus in addition to eliminating any buffering line drivers and line receivers for all but a few lines, the shift register itself being a lower cost device. The shift register utilizes fewer pins and requires less board area than parallel multiplexers or latches. In addition to reducing the system external input and output buffering, the invention also reduces internal buffering within a unit of the system by permitting logic to operate at different levels with a minimum amount of buffering. Each of the data input shift registers represents a large number of input lines that normally would have required individual line receivers. In the present invention, the output of the shift register requires only one line receiver rather than the plurality previously required.

For the purposes of the appended claims, the term digital data signals is utilized to encompass binary, BCD, etc. digital data as well as discrete digital data signals.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. Input/output apparatus for a digital processor having a parallel bit data input/output bus for entering digital and analog data signals into said processor and for receiving digital and analog data signals from said processor comprising:

multiplexer means responsive to said analog data signals for sequentially providing said analog signals on an output thereof, analog-to-digital converter means coupled between said multiplexer means and said data bus for converting said sequentially provided analog signals to parallel bit digital signals and for providing said parallel bit digital signals to first predetermined bits of said data bus, parallel-to-serial shift register means coupled to receive at least one of said digital data signals in bit parallel fashion for providing said digital data signal in bit serial fashion to a second predetermined bit of said data bus simultaneously with said signals applied to said first predetermined bits, thereby simultaneously entering said digital and analog data signals into said digital processor, digital-to-analog converter means coupled to said first predetermined bits of said data bus for sequentially providing analog data signals corresponding to parallel digital data signals sequentially provided to said first predetermined bits by said digital processor, a plurality of sample and hold means coupled to said digital-to-analog converter means for sequentially sampling and holding said sequentially provided analog data signals, respectively, thereby providing said analog data signals from said digital processor, and serial-to-parallel shift register means coupled to said second predetermined bit of said data bus for receiving at least one of said digital data signals provided in bit serial fashion, by said processor, to said second predetermined bit of said data bus simultaneously with said parallel digital data signals provided to said first predetermined bits, for providing said digital data signals in bit parallel fashion, thereby simultaneously receiving said digital and analog data signals from said digital processor.

2. The apparatus of claim 1 including a plurality of parallel-to-serial shift register means coupled to receive a respective plurality of said digital data signals in bit parallel fashion for providing said digital data signals in bit serial fashion to a respective plurality of further predetermined bits of said data bus simultaneously with said signals applied to said first predetermined bits, and a plurality of serial-to-parallel shift register means coupled to a respective plurality of further predetermined bits of said data bus for receiving a respective plurality of said digital data signals provided in bit serial fashion, by said processor, to said further predetermined bits of said data bus simultaneously with said parallel digital data signals provided to said first predetermined bits, for providing said digital data signals in bit parallel fashion.

3. Apparatus for simultaneously entering digital data signals and analog data signals into a digital processor having parallel bit data input means comprising:

multiplexer means responsive to said analog data signals for sequentially providing said analog signals, analog-to-digital converter means coupled between said multiplexer means and said data input means for converting said sequentially provided analog signals to corresponding sequentially provided parallel bit digital signals and for providing, in parallel, said parallel bit digital signals to respective first predetermined bits of said data input means, and parallel-to-serial converter means coupled to receive at least one of said digital data signals in bit parallel fashion for providing said digital data signal in bit serial fashion to a second predetermined bit of said data input means simultaneously with said signals applied to said first predetermined bits, thereby simultaneously entering said digital and analog data signals into said digital processor.

4. The apparatus of claim 3 in which said parallel bit data input means comprises a parallel bit data input bus.

5. The apparatus of claim 3 in which said parallel-to-serial converter means comprises shift register means.

6. The apparatus of claim 5 including a plurality of parallel-to-serial shift register means coupled to receive said digital data signals, respectively, in bit parallel fashion for providing said respective digital data signals in bit serial fashion to respective further predetermined bits of said data input means simultaneously with said signal applied to said first predetermined bits.

7. Apparatus for receiving digital and analog data signals from a digital processor having parallel bit data output means comprising:

digital-to-analog converter means coupled to first predetermined bits of said data output means for sequentially providing analog data signals corresponding to parallel digital data signals sequentially provided to said first predetermined bits by said digital processor, a plurality of sample and hold means coupled to said digital-to-analog converter means for sequentially sampling and holding said sequentially provided analog data signals, respectively, thereby providing said analog data signals from said digital processor, and serial-to-parallel converter means coupled to a second predetermined bit of said data output means for receiving at least one of said digital data signals provided in bit serial fashion, by said digital processor, to said second predetermined bit of said data output means simultaneously with said parallel digital data signals provided to said first predetermined bits, for providing said digital data signal in bit parallel fashion, thereby simultaneously receiving said digital and analog data signals from said digital processor.

8. The apparatus of claim 7 in which said parallel bit data output means comprises a parallel bit data output bus.

9. The apparatus of claim 7 in which said serial-to-parallel converter means comprises shift register means.

10. The apparatus of claim 7 including a plurality of serial-to-parallel shift register means coupled to a plurality of further bits of said data output means for receiving said respective digital data signals provided in bit serial fashion by said digital processor to said respective further predetermined bits of said data output means simultaneously with said parallel digital data signals provided to said first predetermined bits, for providing said respective digital data signals in bit parallel fashion.

* * * * *